United States Patent [19]

Jackson et al.

[11] Patent Number: 5,118,999
[45] Date of Patent: Jun. 2, 1992

[54] FOCUS COIL CURRENT GENERATOR FOR A CATHODE RAY TUBE

[75] Inventors: David R. Jackson; Leroy W. Nero, both of Indianapolis, Ind.

[73] Assignee: Thomson Consumer Electronics, Inc., Indianapolis, Ind.

[21] Appl. No.: 733,583

[22] Filed: Jul. 22, 1991

[51] Int. Cl.⁵ .................................................. H01J 29/58
[52] U.S. Cl. .................................................. 315/382
[58] Field of Search .................. 315/382, 382.1; 358/60

[56] References Cited

U.S. PATENT DOCUMENTS

| 4,587,465 | 5/1986 | Truskalo | 315/382 |
| 4,611,151 | 9/1986 | Hoover et al. | |
| 4,644,230 | 2/1987 | Federle | 315/382 |
| 5,039,923 | 8/1991 | Ogino et al. | 315/382 |

OTHER PUBLICATIONS

Service Manual of a projection television rec., VP8X2 chassis, publ. by Hitachi Corp., pp. 58, 59, 68, 279 & 280.

Primary Examiner—Theodore M. Blum
Attorney, Agent, or Firm—Joseph S. Tripoli; Joseph J. Laks; Sammy S. Henig

[57] ABSTRACT

A projection television receiver has a cathode ray tube with an electron gun for emitting an electron beam incident on a screen, an electromagnetic deflection yoke and an electromagnetic focusing coil. A horizontal deflection driving circuit is coupled to a horizontal deflection coil and provides deflection current to the horizontal deflection coil for scanning the beam repetitively on the screen. The focusing coil is driven from a current step-down transformer having a primary winding coupled in series with the horizontal deflection coil. A secondary winding of the transformer is coupled to the focusing coil for driving the focusing coil with a horizontal rate parabolic current. A capacitor-resistor circuit is coupled in parallel with the focusing coil and with the secondary winding of the transformer for adjusting a phase relationship of the parabolic current relative to the horizontal deflection current and for adjusting the amplitude of the parabolic current.

19 Claims, 4 Drawing Sheets

FOCUS COIL CURRENT GENERATOR FOR A CATHODE RAY TUBE

The invention relates to an arrangement for producing a dynamically varying electromagnetic focus field that is applied to an electron beam emitted by an electron beam gun of a cathode ray tube (CRT) for focusing a beam spot on the CRT screen.

In one prior art projection television receiver, in which three CRT's are utilized, focusing of the electron beam is provided by a magnetic focus field, forming a magnetic lens. Part of the focus field is produced by a permanent magnet that is placed on a neck of each CRT in a region of the electron beam path that is closer to the electron beam gun than to a main deflection yoke of the CRT. Because of the geometry of the CRT screen that is not spherically-shaped and because the electron beam passes closer to the permanent magnet when the electron beam landing location on the CRT screen is closer to the CRT screen edges than to the center, focusing provided by the permanent magnet is not optimal. To improve overall focusing on the entire screen the focal length of the magnetic lens is made, in such prior art, to vary dynamically, as a function of the current beam landing location, using a pair of focusing coils. One of the pair of focusing coils varies the magnetic focus field at a vertical rate parabolic manner, referred to herein as the vertical focusing coil. The other one, referred to herein as the horizontal focusing coil, varies the magnetic focus field at a horizontal rate parabolic manner.

Each horizontal focusing coil associated with each CRT is required to be driven by a parabola-like horizontal rate current. The focusing coil driver circuitry is, typically, constructed on a printed circuit board. It may be desirable to reduce voltages developed in conductors of the printed circuit board that carry the drive currents of the focusing coils so as to alleviate insulation requirements associated with the conductors in the printed circuit board.

Therefore, in accordance with an inventive feature, the focusing coils are driven in parallel, rather than in series.

In accordance with another inventive feature, the drive currents of the focusing coils are produced from at least a trace portion of the deflection current. The drive currents are produced using a current-transformer having a primary winding that is coupled in series with the deflection current and a secondary winding that is coupled to the focusing coils. Advantageously, since the trace portion of the deflection current has a substantially higher amplitude than the sum of the driving currents in the three focusing coils, required to drive the focusing coils in parallel, only a minimal number of winding turns is required in the transformer primary winding. The result is that a relatively inexpensive transformer can be utilized. Furthermore, the focusing coils are driven in parallel, rather than in series, the amplitude of the voltage in the transformer secondary winding is relatively small that simplifies the transformer.

A video display apparatus, embodying an aspect of the invention, includes a cathode ray tube including an evacuated glass envelope. A display screen is disposed at one end of the envelope and an electron gun assembly is disposed at a second end of the envelope. The electron gun assembly produces an electron beam that forms a raster at electron beam landing locations on the screen. A deflection winding is disposed on a neck of the cathode ray tube. A deflection current is generated in the deflection winding for producing a main deflection field in a beam path of the electron beam that varies in a manner to vary the electron beam landing location. A transformer has a first winding that is coupled to the deflection winding to conduct through the first winding at least a portion of the deflection current during a trace interval of a deflection cycle. A first focusing coil disposed on the neck of the cathode ray tube and is responsive to a transformer-coupled signal that is generated in a second winding of the transformer and that is derived from the deflection current portion. A current is generated in accordance with the transformer-coupled signals, in the focusing coil at a frequency that is related to a deflection frequency. The focusing coil current produces a magnetic focus field in the neck of the cathode ray tube that focuses the beam at the beam landing locations as the beam landing location varies.

Figure 1:
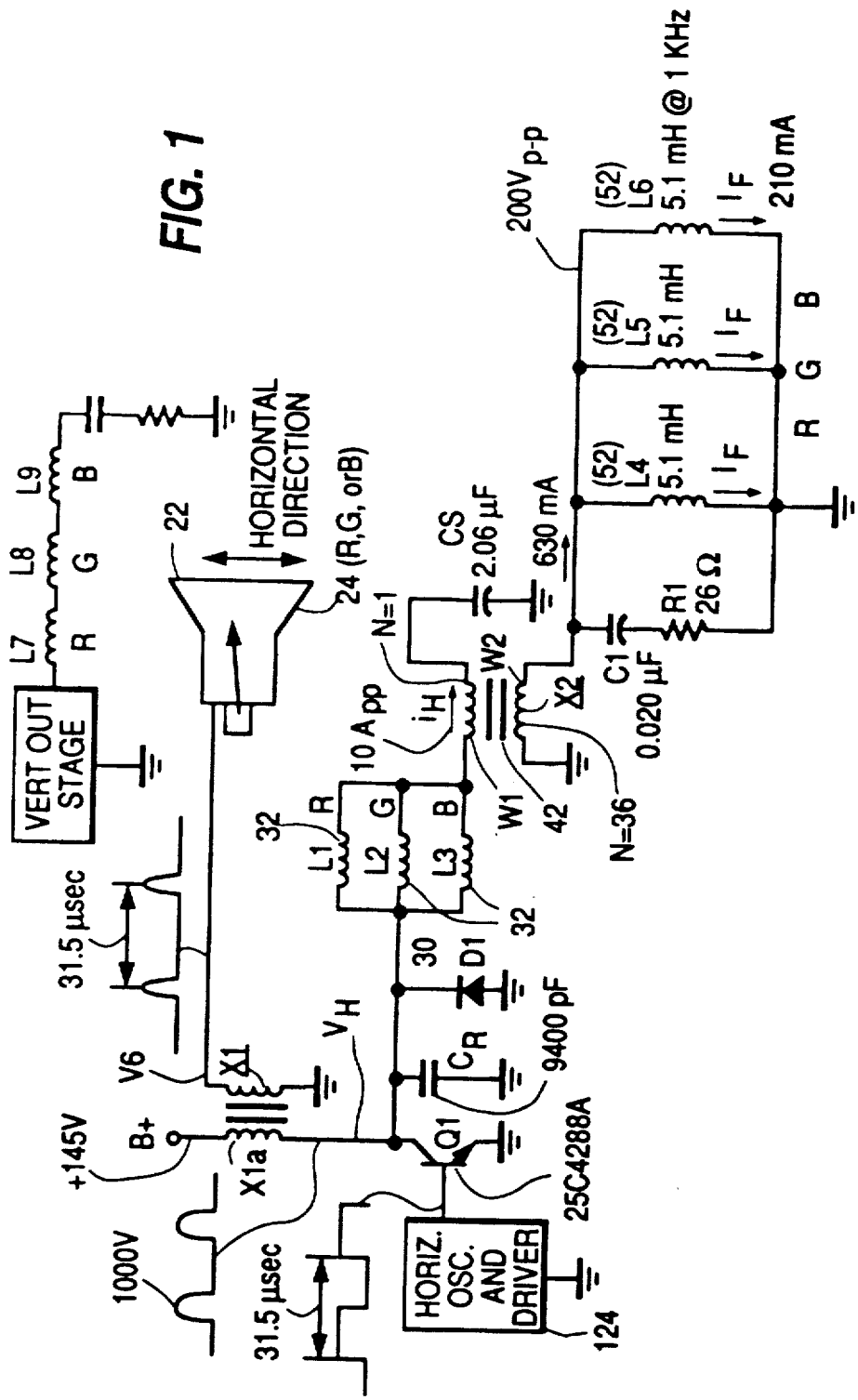
FIG. 1 is a schematic diagram of a horizontal focusing coil driving circuit, embodying to an aspect of the invention, that is coupled to a horizontal deflection circuit.

In FIG. 1, three CRTs 24 of the type Hitachi 180BTB22 of a projection television receiver produce, each, an electron beam. Only one of the three CRTs 24, red CRT 24, is shown in FIG. 1. Horizontal and vertical deflection windings such as windings L1 and L7 cause the beam to scan beam landing locations across the screen of red CRT 24, in horizontal lines which are vertically displaced to form a raster.

Figure 4A:
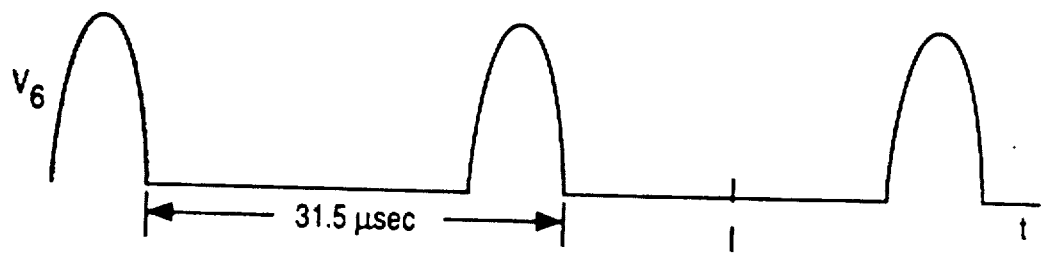
FIGS. 4a–4c illustrate waveforms useful for explaining the circuit of FIG. 1.
Figure 4B:
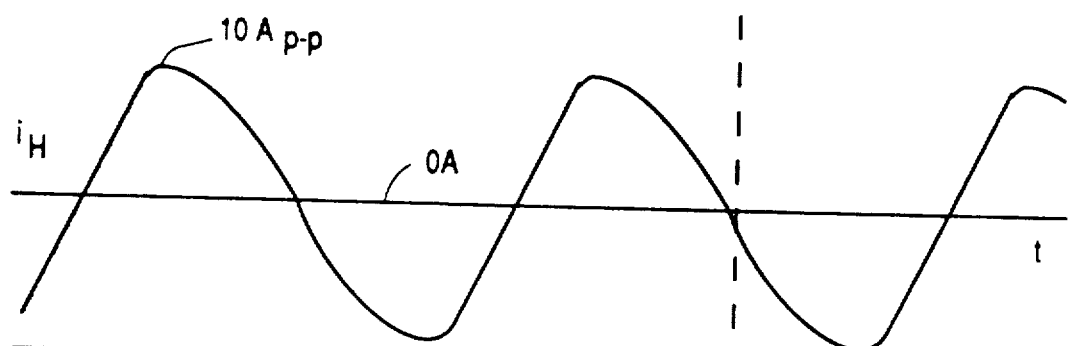

A horizontal oscillator and driver stage 124 is coupled to a horizontal output transistor Q1 having a collector that is coupled to a winding X1a of a horizontal flyback transformer X1. The emitter of transistor Q1 is grounded. A drive signal is applied from stage 124 to the base of transistor Q1 that causes transistor Q1 to switch at a frequency $2xf_H$ and to conduct from a B+ power supply of +145 volts through winding X1a transformer X1. Transformer X1 may have various secondary windings for producing, for example, a flyback filament output pulse V6, during retrace, as shown generally in FIGS. 1 and 4a.

the collector of transistor Q1 of FIG. 1 is also coupled to a damper diode D1, a retrace capacitor $C_R$ and a parallel arrangement of main horizontal deflection coils L1, L1 and L3 having, each, an inductance of 750 $\mu$H which produce horizontal deflection fields for scanning the beams over a repetitive scanning period in each CRT of the receiver. A trace or S-shaping capacitor CS is coupled in series with a parallel arrangement of the horizontal deflection coils. A ramp, horizontal deflection current $i_H$ at the frequency $2xf_H$ having a waveform that is shown in FIG. 4b causes the electron beam to scan from a maximum deflection at one side of the screen, through zero deflection, at the center of the screen, to a maximum deflection at the opposite side of the screen.

Horizontal deflection coils L1, L2 and L3 of FIG. 1 are coupled in parallel, one for each of the red, blue and green CRTs of the projection television receiver. Main vertical deflection coils L7, L8 and L9 provide vertical deflection in the CRTs.

Main horizontal deflection current $i_H$ that flows through the parallel arrangement of coils L1, L2 and L3 that is coupled in series with a primary winding W1 of a transformer X2, embodying an inventive feature, is about 10A peak-to-peak, and shaped substantially as a sawtooth current at the horizontal scan frequency. The horizontal scan frequency is $2xf_H$, or about 31,750 KHz, having a period of about 32 microseconds.

Figure 2:
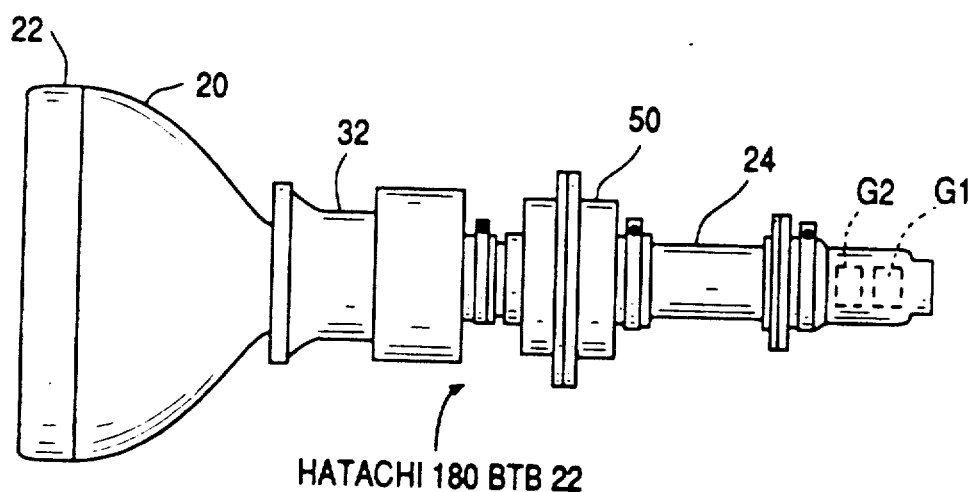
FIG. 2 is an elevation view of a prior art CRT that is utilized in FIG. 1.

Each of the three CRTs is included in a corresponding CRT assembly 20 such as shown in FIG. 2. Similar symbols and numerals in FIGS. 1 and 2 indicate similar items or functions.

CRT assembly 20 of FIG. 2, includes an electron gun having grids G1 and G2 disposed at one end of CRT 24, for producing the electron beam incident on the phosphors of a screen 22, at the opposite end. Between the electron gun and screen 22, a main deflection yoke assembly 32 is provided with main horizontal and vertical deflection coils such as, for example, L1 and L7 of FIG. 1, respectively, for scanning the electron beam in successive vertically spaced horizontal lines.

To the rear of deflection yoke assembly 32 of FIG. 2, along the electron beam path from the electron gun to screen 22, a magnetic focus assembly 50 is provided to focus the electron beam such that the beam is incident on the phosphors of screen 22 as a sharp dot.

Figure 3:
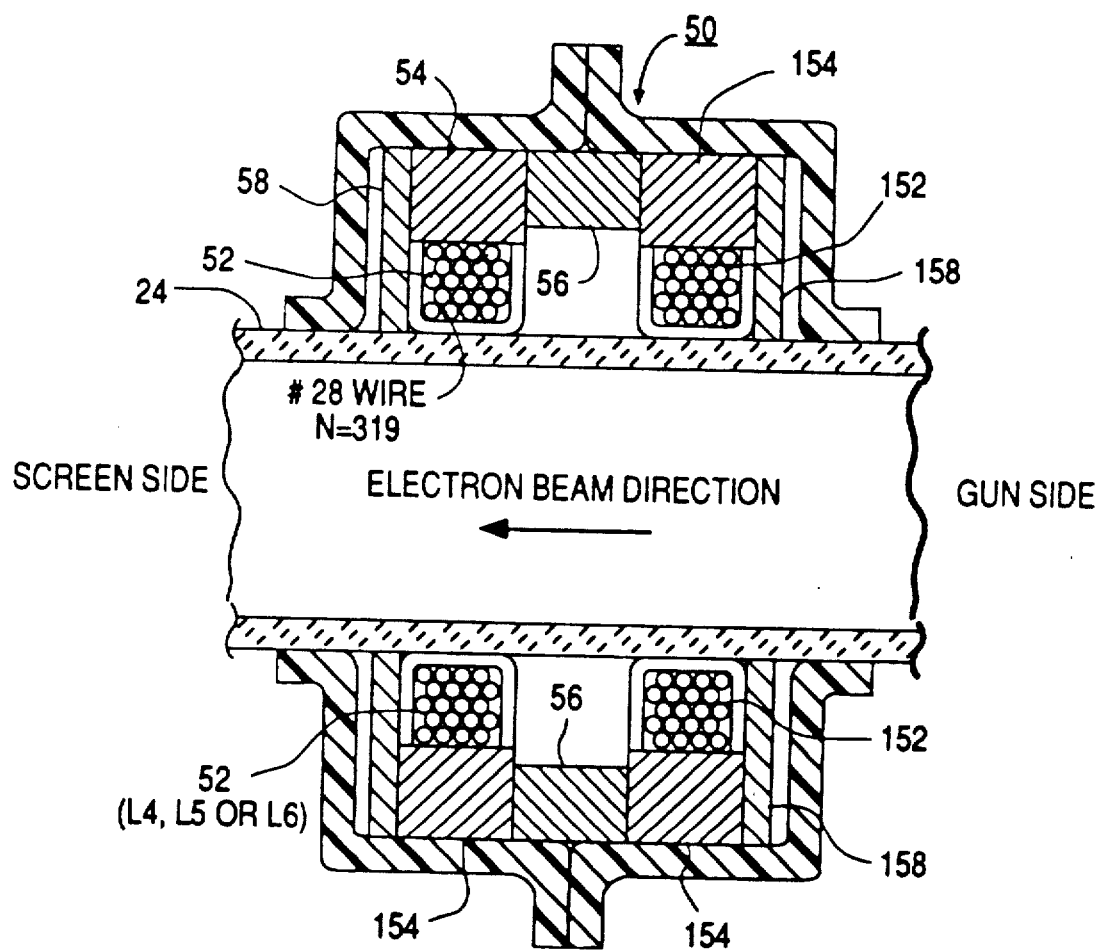
FIG. 3 is a partial section view along the axis of the CRT in FIG. 2, showing a magnetic focus assembly.

FIG. 3 illustrates a sectional view of magnetic focus assembly 50 of FIG. 2. Similar symbols and numerals in FIGS. 1, 2 and 3 indicate similar items or functions. Magnetic focus assembly 50 includes a ring-shaped permanent magnet 54 that surround and is co-axial with the neck of CRT 24. A second ring-shaped, permanent magnet 154 also surrounds and is co-axial with the neck of CRT 24. Magnet 154 is closer than magnet 54 to the electron gun of CRT 24. A ring-shaped field shunt 56 made of a permeable material is placed between magnets 54 and 154 to form a magnetic path therebetween having a low magnetic reluctance. The arrangement of magnets 154 and 54 and shunt 56 produces axial static focus magnetic field in that portion of the neck of CRT 24 of approximately 330 gauss.

A ring-shaped horizontal focusing coil 52 surrounded by magnet 54 surrounds the neck of CRT 24. Similarly, a ring-shaped vertical focusing coil 152 surrounded by magnet 154 surrounds the neck of CRT 24. Focusing coils 52 and 152 of FIG. 3 produce dynamically varying focus magnetic fields which are superimposed on the static field of permanent magnets 54 and 154. The dynamically varying resultant magnetic focus field, applied to the electron beam, is less weakened or enhanced when the beam is at the center of the screen 22 relative to when the beam is at the edges of screen 22. Vertical focus coil 152 is driven by a vertical rate current in a conventional manner, not shown. The result is that the focal length of assembly 50 dynamically varies for maintaining focus at all points on the screen.

According to an aspect of the invention, each of dynamic electromagnetic horizontal focus coil 52 of each CRT is driven by transformer-coupled horizontal deflection current $i_H$ that varies the focus field in a manner correlated to horizontal deflection. Coil 52 represents a focus coil L4 for the red CRT, a focus coil L5 for the green CRT and a focus coil L6 for the blue CRT.

Winding W1 of transformer X2, embodying an inventive feature, is coupled in series with the parallel arrangement of horizontal deflection coils L1, L2 and L3, namely between the coils and S-shaping capacitor CS of the deflection drive circuit. A secondary winding W2 of transformer X2 is coupled across each of focus coils L4, L5 and L6.

Figure 4C:
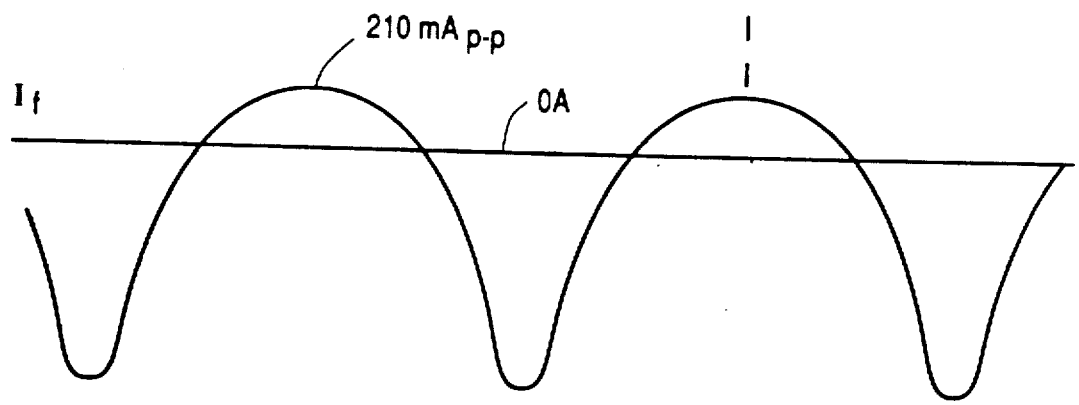

In accordance with another inventive feature, coils L4, L5 and L6 are coupled in parallel and produce corresponding focusing fields that vary in a horizontal rate manner. Each of horizontal focusing coils L4, L5 and L6 produces a field that weakens the focusing field when the beam spot is at the edges relative to when the beam spot is at the center of screen 22. A parabolic-like current $I_F$ of FIG. 1 is produced in each of horizontal focusing coils L4, L5 and L6, as shown in FIG. 4c. The dynamic focusing field produced by each of coils L4, L5 and L6 of FIG. 1 peaks approximately in the vicinity of flyback, as shown in FIG. 4a, and subtracts from the field produced by permanent focus magnet 54 of FIG. 3. The result is that when the electron beam spot is at the left and right edges of screen 22 of CRT 24, each of the resultant focus fields is weakened relative to when the electron beam spot is at the center of screen 22. At the center of horizontal trace, corresponding to the horizontal center of screen 22, current $I_F$ is at opposite polarity than at the ends of horizontal trace. Therefore, each of coils L4, L5 and L6 produce a field that enhances the corresponding resultant magnetic focus field. Static adjustment of each of the resultant magnetic focus field may be obtained by conducting a DC current having an adjustable level through vertical focus coil 152, in a well known manner, not shown.

Transformer X2, which transformer-couples deflection current $i_H$ to focus coils L4, L5 and L6, coupled to its secondary winding W2, is preferably a voltage step-up, current step-down transformer. Deflection current $i_H$ flowing in primary winding W1 of transformer X2 having a single winding turn is a sawtooth current, as shown in FIG. 4b. Current $i_H$ is at about 10A, peak-to-peak, and at a frequency $2xf_H$. Transformer X2 has a winding ratio, for example, of 1:36, providing a current of about 630 mA in secondary winding W2. The current drive coupled through transformer X2 produces a parabola-like shaped driving current $I_F$ through each of focusing coils L4, L5 and L6, as shown in FIG. 4c, hence a time variation in the focusing field.

A capacitor C1 is coupled in series with a resistor R1 to form a series arrangement that is coupled in parallel with parallel-coupled horizontal focus coils L4, L5 and L6, and with secondary winding W2 of transformer X1, defining a shunt. The value of capacitor C1 is selected to adjust the phase of parabolic current $I_F$ of FIG. 4c relative to deflection current $i_H$ of FIG. 4b. Resistor R1 of FIG. 1, that is coupled in series with capacitor C1 in the shunt, is selected to adjust the amplitude of parabolic current $I_F$. The values of capacitor C1 and resistor R1 are chosen such that the phase and amplitude of parabola current $I_F$ cause the electron beam to be focused at all points along a horizontal axis of the screen 22. Current $I_F$ compensates for the variation in length of the beam path between the center of the screen and the edges in a the CRT, and also for the effects of the proximity of the beam to the ferrous materials of magnets 154 and 54 at the edges of the screen. Dynamic horizontal focusing coils L4, L5 and L6 are arranged to provide sufficient magnetic flux to dynamically vary by about 5% the flux level produced by the permanent magnets 54 and 154, typically about 330 gauss.

In accordance with another aspect of the invention, horizontal focusing coils L4, L5 and L6 for the three CRTs are coupled in parallel, rather than in series. Therefore, the voltage in winding W2 of transformer X2 is, advantageously, smaller than if they were coupled in series. The result is that transformer X2 is subject to less stringent requirement. Also, because of lower voltages associated with such parallel coupling, the requirements for insulating conductors of coils L4, L5 and L6, that carry currents $I_F$, from other conductors on a printed circuit board that includes such conductors are alleviated. The result is that a more compact driver-focusing coil conductor arrangement configuration in such printed circuit board can be, advantageously, obtained. Moreover, each of the coils can be of a higher impedance (a relatively greater number of turns, driven at a lower current) to obtain a given amount of focusing field variation, than with focusing coils connected in series. By using a higher impedance, a higher Q is obtained that is apt for operation at $2xf_H$, and is characterized by low power losses.

What is claimed is:

1. A video display apparatus, comprising:
   a first cathode ray tube including an evacuated glass envelope, a display screen disposed at one end of said envelope and an electron gun assembly disposed at a second end of said envelope, said electron gun assembly producing an electron beam that forms a raster at electron beam landing locations on said screen;
   a deflection winding disposed on a neck of said cathode ray tube;
   means for generating a deflection current in said deflection winding for producing a main deflection field in a beam path of said electron beam that varies in a manner to vary the electron beam landing location;
   a transformer having a first winding that is coupled to said deflection winding to conduct through said first winding at least a portion of said deflection current during a trace interval of a deflection cycle; and
   a first focusing coil disposed on said neck of said cathode ray tube and responsive to a transformer-coupled signal that is generated in a second winding of said transformer and that is derived from said deflection current portion for generating, in accordance with said transformer-coupled signal, a current in said focusing coil at a frequency that is related to a deflection frequency, said focusing coil current producing a magnetic focus field in said neck of said cathode ray tube that focuses said beam at said beam landing locations as said beam landing location varies.

2. An apparatus according to claim 1 wherein said deflection current provides horizontal deflection and said deflection winding comprises a horizontal deflection winding.

3. An apparatus according to claim 1 wherein said deflection current is transformer-coupled to said second transformer winding and flows in said focusing coil.

4. An apparatus according to claim 1 wherein said focusing coil current varies in a parabola-like manner at a frequency that is substantially higher than that of horizontal sync pulses in the NTSC standard.

5. An apparatus according to claim 1 further comprising, an impedance coupled to said transformer for controlling at least one of a phase and an amplitude of said focusing coil current.

6. An apparatus according to claim 5 wherein said impedance comprises an R-C network.

7. An apparatus according to claim 5 wherein said second transformer winding, said focusing coil and said impedance are coupled in parallel to one another.

8. An apparatus according to claim 1 further comprising, a second cathode ray tube having a second horizontal deflection winding and a second focusing coil mounted thereon, said second focusing coil being responsive to said transformer coupled signal for generating a second focusing coil current in said second focusing coil, wherein said first and second cathode ray tube are included in a projection television apparatus.

9. An apparatus according to claim 8 wherein said first and second focusing coils and said second transformer winding are coupled in parallel with one another.

10. An apparatus according to claim 9 further comprising an R-C network coupled in parallel with each of said first and second focusing coils to control a phase of each of said focusing coil currents.

11. An apparatus according to claim 8 wherein said first and second horizontal deflection windings form a parallel arrangement that is coupled in series with said first transformer winding.

12. An apparatus according to claim 1, further comprising a capacitor coupled in parallel with said focusing coil and with said second transformer winding of said transformer, defining a shunt, for adjusting a phase relationship of said focusing coil current relative to said deflection current.

13. An apparatus according to claim 12, further comprising a resistor coupled in series with said capacitor in said shunt, the resistor adjusting an amplitude of said focusing coil current and said series coupled resistor and capacitor being coupled in parallel with said second transformer winding of said transformer and with said focusing coil.

14. An apparatus according to claim 1, further comprising second and third cathode ray tubes having second and third focusing coils, respectively, the focusing coils of the three cathode ray tubes being coupled in parallel and driven commonly from said second transformer winding of said transformer.

15. An apparatus according to claim 1, wherein said transformer is a current step-down transformer.

16. An apparatus according to claim 1, wherein said first transformer winding of said transformer is coupled between said deflection winding and an S-shaping capacitor.

17. An apparatus according to claim 1, wherein the electron beam is scanned horizontally at $2xf_H$.

18. An apparatus according to claim 1 further comprising, a permanent focus magnet that produces a portion of said focus field.

19. A video display apparatus, comprising:
   first and second cathode ray tubes, each including an evacuated glass envelope, a display screen disposed at one end of said envelope and an electron gun assembly disposed at a second end of said envelope, said electron gun assembly producing an electron beam that forms a raster at electron beam landing locations on said screen;
   a deflection winding disposed on a neck of each of said first and second cathode ray tubes;

means for generating a deflection current in each of said deflection windings for producing a main deflection field in a beam path of said electron beam in each of said cathode ray tubes that varies in a manner to vary the electron beam landing location;
first and second focusing coils disposed on said necks of said first and second cathode ray tubes, respectively, and coupled in parallel; and
means coupled in parallel with each of said parallel coupled focus coils for generating first and second currents in said first and second focusing coils, respectively, at a frequency that is related to a deflection frequency, said focusing coil currents producing a magnetic focus field in each of said cathode ray tubes.

* * * * *